United States Patent [19]

Donaghy

[11] 4,137,131
[45] Jan. 30, 1979

[54] PROCESS FOR ELECTROLYTIC DEPOSITION OF METALS ON ZIRCONIUM MATERIALS

[75] Inventor: Robert E. Donaghy, Wilmington, N.C.

[73] Assignee: General Electric Company, San Jose, Calif.

[21] Appl. No.: 729,861

[22] Filed: Oct. 4, 1976

[51] Int. Cl.² .................................................. C25D 5/34
[52] U.S. Cl. .................................................... 204/32 R
[58] Field of Search ................................. 204/32 R, 25

[56] References Cited

U.S. PATENT DOCUMENTS

| 3,560,352 | 2/1971 | van Garderen et al. | 204/32 R |
| 4,017,368 | 4/1977 | Wax et al. | 204/32 R |

OTHER PUBLICATIONS

Electroplating Engineering Handbook, A. K. Graham, Editor, Reinhold, 1962, pp. 153, 154.

Metal Finishing Guidebook Directory, N. Hall, Editor, Metals and Plastics Publications, Inc., 1975, p. 134.

Primary Examiner—John H. Mack
Assistant Examiner—William Leader
Attorney, Agent, or Firm—Ivor J. James, Jr.; Sam E. Laub; Samuel E. Turner

[57] ABSTRACT

A process for the electrolytic deposition of a metal layer on an article comprised of zirconium or a zirconium alloy is disclosed. The article is activated in an aged aqueous solution comprising from about 10 to about 20 grams per liter ammonium bifluoride and from about 0.75 to about 2 grams per liter of sulfuric acid. The solution is aged by immersion of pickled zirconium in the solution for at least about 10 minutes. The loosely adhering film formed on the article in the activating step is removed and the article is contacted with an electrolytic plating solution containing the metal to be deposited on the article in the presence of an electrode receiving current.

19 Claims, 1 Drawing Figure

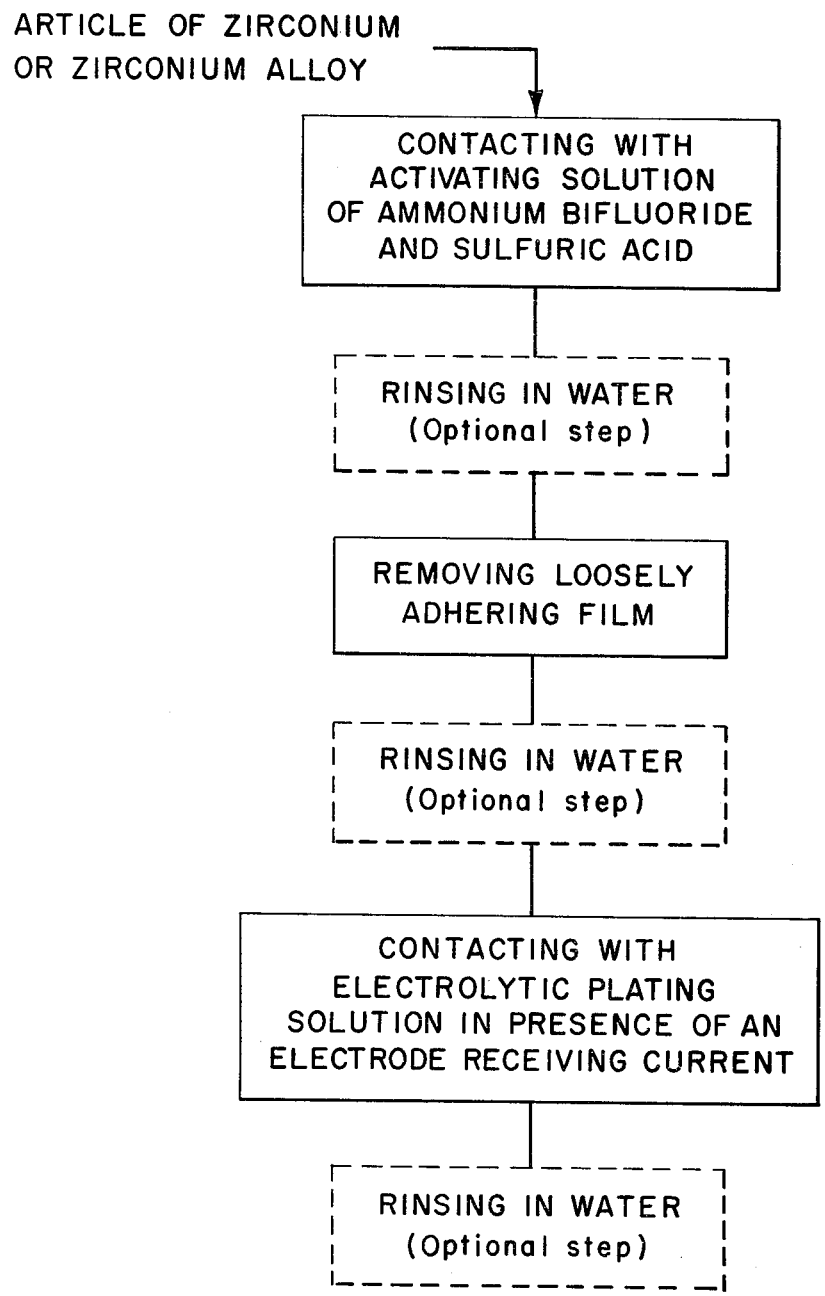

PROCESS FOR ELECTROLYTIC DEPOSITION OF METALS ON ZIRCONIUM MATERIALS

BACKGROUND OF THE INVENTION

This invention relates to a process for electrolytic deposition of a metal layer on zirconium or a zirconium alloy, and more particularly to an improved process for electrolytic deposition of a metal film such as a copper film on the internal surface of a long hollow cylindrical tube of zirconium or a zirconium alloy.

Nuclear reactors are presently being designed, constructed and operated with the nuclear fuel being contained in fuel elements which can have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves several purposes and two primary purposes are: first, to prevent contact and chemical reactions between the nuclear fuel and the coolant or the moderator if a moderator is present, or both if both coolant and moderator are present; and second, to prevent the radioactive fission products, some of which are gases, from being released from the fuel into the coolant or the moderator, or both if both coolant and moderator are present. Common cladding materials are zirconium and its alloys as well as others that are commonly used. The failure of the cladding, i.e., a loss of the leak tightness, can contaminate the coolant or moderator and the associated systems with radioactive long-lived products to a degree which interferes with plant operation.

Problems have been encountered in the operation of nuclear fuel elements which employ certain metals and alloys as the clad material due to mechanical or chemical reactions of these cladding materials under certain circumstances. Zirconium and its alloys, under normal circumstances, are excellent nuclear fuel claddings since they have low neutron absorption cross sections and at temperatures below about 750° F. (about 398° C.) are strong, ductile, extremely stable and non-reactive in the presence of demineralized water or steam which are commonly used as reactor coolants and moderators.

However, fuel element performance has revealed a problem with the brittle splitting of the cladding due to the combined interactions between the nuclear fuel, the cladding and the fission products produced during nuclear fission reactions. It has been discovered that this brittle splitting is due to localized mechanical stresses resulting from the differential expansion of the fuel into contact with the cladding (i.e., stresses in the cladding are localized at cracks in the nuclear fuel). Corrosive fission products are released from the nuclear fuel and are present at the intersection of the fuel cracks with the cladding surface. Fission products are created in the nuclear fuel during the fission chain reaction occurring during operation of a nuclear reactor. The localized stress is exaggerated by high friction between the fuel and the cladding.

A composite cladding container disclosed in U.S. patent application Ser. No. 522,769, now abandoned in favor of continuation application Ser. No. 725,824, filed Sept. 23, 1976, has improved performance and resistance to mechanical and chemical reactions. This application was filed in the names of Gerald M. Gordon and Robert L. Cowan on Nov. 11, 1974 and is assigned to the same assignee as the present invention. The composite cladding container is comprised of an outer layer consisting of zirconium or a zirconium alloy that has bonded on the inside surface of the outer layer a protective layer of a material selected from the group consisting of copper, nickel, iron or alloys thereof. Various methods are disclosed for coating the inside surface of the outer layer of zirconium or a zirconium alloy with the protective layer, and one of the methods involves electroplating. Copper is a particularly preferred material for use as the protective layer.

A novel aqueous electrolytic activating solution and a method for electroplating a metal layer on zirconium and zirconium alloys are disclosed in U.S. Pat. No. 4,017,368, issued Apr. 12, 1977. This application was filed in the names of Daniel E. Wax and Robert L. Cowan on Nov. 11, 1974 and is assigned to the same assignee as the present invention. The electroplating method of this invention is particularly suitable for coating the inside surface of zirconium or a zirconium alloy with the protective layer of copper, nickel or iron (as called for in application Ser. No. 522,769). The first step of the process comprises activating the zirconium or zirconium alloy in an aged aqueous activating solution comprising from about 10 to about 20 grams per liter of ammonium bifluoride and from 0.75 to about 2 grams per liter of sulfuric acid. The solution is aged by immersion of pickled zirconium in the solution for about 10 minutes. The second step of the process comprises electroplating the zirconium material in a plating bath of the metal to be plated on the zirconium material in the presence of an electrode.

An electroplating process requires the use of an electrode approximately the same length as the piece being plated. The nuclear fuel cladding is a tube of about 14 feet in length and about 0.50 inch in internal diameter. This means that an electrode of about 14 feet in length with about 0.125 inch in diameter is required for an electroplating process.

Zirconium materials activated in an ammonium bifluoride-sulfuric acid solution have on the surface a first layer of a black color that is highly adherent to the zirconium substrate and is electrically conductive. This layer is believed to make it possible to initiate electroplating of the zirconium material. These activated zirconium materials also have a second layer on the first layer that is a loosely adhering layer of similar color to the first layer. The presence of this second layer is believed to have an adverse effect on adhesion and to give rise to the possibility of blistering of the coating.

Therefore it is desirable to develop an electrolytic process for plating zirconium materials that includes a step of removing the loosely adhering layer on the zirconium material resulting from the activation of the zirconium material in the ammonium bifluoride-sulfuric acid solution.

SUMMARY OF THE INVENTION

It has now been discovered that an article comprised of zirconium or a zirconium alloy can be electrolytically plated with a metal layer of a metal selected from the group consisting of copper, nickel and chromium to achieve improved adhesion between the metal layer and the article when the article is free of any loosely adhering films formed during an activation step. The first step of this process is activating the article in an aged aqueous activating solution comprised of from about 10 to about 20 grams per liter of ammonium bifluoride and from about 0.75 to about 2 grams per liter of sulfuric acid. The next step of the process is removing the loosely adhering film formed on the article in the activating step. The last step of the process is contacting the article with an electrolytic plating solution containing the metal therein to be deposited on the article in the presence of an electrode receiving current.

The removal of the loosely adhering film formed on the article in the activation step can be done by chemical treatment, ultrasonic treatment or by swabbing the surface with cotton or an organic material. The chemical removal of the film is accomplished by using (a) an aqueous solution comprising from about 2 to about 10 percent fluoboric acid and the balance water, or (b) an aqueous solution comprising from about 2 to about 10 percent hydrofluosilicic acid and the balance water. The ultrasonic removal of the film is accomplished by immersing the article in water and applying ultrasonic energy to the article.

OBJECTS OF THE INVENTION

It is an object of this invention to provide a process for the electrolytic plating of an article comprised of zirconium or a zirconium alloy, especially when the article is in the form of a nuclear fuel element cladding comprising a long hollow cylindrical tube of small diameter.

Another object of this invention is to provide a step for removing the loosely adhering film on an article comprised of zirconium or a zirconium alloy after being contacted in an activating solution and prior to being subjected to electrolytic plating.

Other objects and advantages of this invention will become apparent to the person skilled in the art from the following description of the invention and from the appended claims.

DESCRIPTION OF THE INVENTION

This invention comprises a process for the electrolytic deposition of a metal film on an article being comprised of zirconium or a zirconium alloy. The process broadly comprises a step of activating the article, a step of removing any loosely adhering films formed on the article in the activation step and a step of contacting the article with an electrolytic plating solution containing the metal to be deposited on the article in the presence of an electrode receiving current. The process can also include the optional steps of rinsing the article in water (preferably deionized water) after the activation step, the film removal step and the electrolytic plating step. The rinsing prevents carry-over on the surface of the article of the solution with which it was in contact so there is no formation of deposits or films on the article from this solution. When the article is to be contacted with another solution, the rinsing also prevents introduction or impurities in that other solution.

A detailed discussion of the process of this invention will now be presented as shown in the attached FIGURE. In the first step the article of zirconium or a zirconium alloy is contacted with an aged aqueous activating solution comprising from about 10 to about 20 grams per liter of ammonium bifluoride (preferably a starting amount of about 15 grams per liter ammonium bifluoride) and from about 0.75 to about 2.0 grams per liter of sulfuric acid (preferably a starting amount of about 1.0 grams per liter). The solution is aged by immersion of a piece of pickled zirconium for at least about 10 minutes at ambient temperature. It has been found that solutions outside the foregoing ranges for the ammonium bifluoride component and the sulfuric acid component do not produce good adherent platings on the article.

The article is contacted with the aqueous activating solution for about one minute at ambient temperature (approximately 20°–30° C.), and the activating solution is stirred or otherwise agitated prior to contacting the article with the solution. The article is ready for immediate use in the following steps of this process or can be stored for several days or longer before being used in the following steps of this process.

An optional step of rinsing the article in water can be practiced, preferably using deionized water, to free the article of any residual traces of the activating solution.

The next step is removing any loosely adhering film (i.e. "smut") formed on the article in the activating step. This step is performed by either contacting the article in a chemical solution so the solution removes the film from the article, using ultrasonic energy to remove the film, or swabbing the surface of the article with a cotton swab or an organic swab such as nylon or polyester. The organic swab can be wrapped around a rubber plug and forced through the article when the article is a hollow tube and the wrapped plug is approximately the same size as the internal diameter of the tube. This leaves the article with a dark adherent electrically conducting surface film or layer of zirconium oxide that can be plated with any of the known electrolytic metal plating solutions.

One chemical solution for contacting the article to remove the loosely adhering film is comprised of from about 2 to about 10 percent fluoboric acid by volume in water. Solutions below about 2 percent by volume do not remove the loosely adhering film, and solutions above about 10 percent by volume start to attack the more adherent film underlying the loosely adhering film. The solution is used at about 25±5° C. and the article is contacted in this solution for about one minute.

Another chemical solution for contacting the article to remove the loosely adhering film is comprised of from about 2 to about 10 percent hydrofluosilicic acid by volume in water. Solutions below about 2 percent by volume do not remove the loosely adhering film, and solutions above about 10 percent by volume start to attack the more adherent film underlying the loosely adhering film. The solution is used at about 25±5° C. and the article is contacted in this solution for about one minute.

Removal of the loosely adhering film from the article can also be accomplished by the use of ultrasonic rinsing in water, i.e., submerging the article in water and applying ultrasonic energy in the range of about 20,000 to about 300,000 cycles per second (cps). This is continued for a time of about one to two minutes or more, or until visual observation shows that no more film is being removed. Below about 20,000 cps, the rate of removal is too slow, and the equipment for running above 300,000 cps involves added expense.

Swabbing the loosely adhering film from the article is done by uniformly rubbing the surface with cotton or paper or other absorbent material, or by brushing the surface with a brush containing natural hog bristles or nylon bristles. In one method cotton swabs or organic swabs such as polyester and nylon swabs are rubbed over the surface of the article. When the article is in the form of a tube the swab is driven through the tube by use of air pressure.

Next, after removal of the loosely adhering film, an optional step of rinsing the article in water can be practiced, preferably using deionized water, to free the article of any residual traces of the material used in removing the loosely adhering film. This step is desirable when one or the chemical solutions has been used.

The article is contacted with any of the known electrolytic plating solutions containing the metal to be deposited on the article upon contact with the article in the presence of an electrode receiving current. Typically the article is submerged in the electrolytic plating solution adjacent the electrode with a gap between the article and the electrode of about 0.2 inch or more to enable uniform build up of the metal on the article.

Preferred metals to be deposited on the article of zirconium or a zirconium alloy include copper, nickel and chromium, and an especially preferred metal to be deposited on the article is copper.

For electrolytically depositing copper, an aqueous bath of the following composition has been employed: 150 to 250 grams/liter of copper sulfate ($CuSO_4 \cdot 5 H_2O$), 45 to 110 grams/liter of sulfuric acid ($H_2 SO_4$), and 0.002 to 0.005 grams/liter of thiourea ($NH_2 \cdot CS \cdot NH_2$) with the balance being water. The temperature of the bath is maintained between 32° and 42° C. during plating, and a current density of 16 to 22 amps/decimeter$^2$ (dm$^2$) is applied. When the article is in the form of a long hollow cylindrical tube, the bath is flowed through the tube at 800 to 1200 ml./minute, and the anode is a solid oxygen-free high conductivity copper cylindrical tube 0.125 to 0.200 inch in diameter. This procedure produces a very good as-plated adherence with no porosity. In order to insure that the plated article can be used at elevated temperatures without any substantial loss of adhesion, the plated zirconium is out-gassed at a temperature of about 300° to about 400° F. (149° to 204° C.) for a time period of about three hours. In this out-gassing the temperature is raised from ambient to the final temperature at a rate of about 50° F. to 125° F. per hour.

During the plating of copper on the article, a considerable quantity of hydrogen gas is evolved. The electrolytic copper plating solution is flowed slowly over the article, and this results in the hydrogen tending to adhere to the wall of the tube. It is necessary to remove this hydrogen gas so that it does not develop back-pressure during plating (i.e., pressure on the surface of the article being plated that stops the plating). The plating process is further facilitated when the surface of the article to be plated is positioned in a vertical position so that evolved hydrogen is swept upward away from the surface being plated.

For electrolytically plating nickel on zirconium, an aqueous bath of the following composition is employed: 320 to 340 grams/liter of nickel sulfate ($Ni SO_4 \cdot 6 H_2O$), 40 to 50 grams/liter nickel chloride ($Ni Cl_2 \cdot 6 H_2O$), 36 to 40 grams/liter of boric acid ($H_3 BO_3$) with the balance being water. The pH is maintained between 1.5 to 4.5 by adding more acid. The temperature of the bath is maintained between 45° and 65° C. during plating and a current density of 2.5 to 10 amps/dm$^2$ is applied. When the article is in the form of a long hollow cylindrical tube, the bath is flowed through the tube at 800–1200 ml./minute, and the anode is a solid rolled carbon-nickel cylindrical tube 0.125 to 0.200 inch in diameter. This procedure produces a very good as-plated adherence with no porosity. In order to insure that the plated article can be used at elevated temperatures without any substantial loss of adhesion, the same out-gassing procedure employed above for copper plated article is used.

For electrolytically plating chromium on zirconium, a bath of the following composition is employed: 200 to 300 grams/liter of chromic oxide ($CrO_3$) and 2 to 3 grams/liter of sulfuric acid ($H_2 SO_4$) with the balance being water. The temperature of the bath is maintained between 30° and 50° C. during plating, and a current density of 10 to 20 amps/dm$^2$ is applied. When the article is in the form of a long hollow cylindrical tube, the bath is flowed through the tube at 800 to 1200 ml./minute, and the anode is a solid lead coated iron cylindrical tube 0.125 to 0.200 inch in diameter. This procedure produces a very good as-plated adherence with no porosity. In order to insure that the plated article can be used at elevated temperatures without any substantial loss of adhesion, the same out-gassing procedure employed above for copper plated article is used.

The articles treated by the process of this invention can be zirconium materials taken directly from milling operations or can be articles subjected to prior mechanical cleaning (e.g., grit blasting) or chemically cleaned articles (e.g., cleaned by acid and/or alkaline etching).

Utilizing the foregoing method and the aqueous activating solution, it is possible to obtain a continuous deposit of the metal to be plated on the article of zirconium or a zirconium alloy with a minimum thickness of about 1.5 microns or greater. For best results it is preferred to have a thickness of from about 3 to about 15 microns plated on the article, and it is possible to achieve even thicker coatings with the process of this invention. Articles plated by the foregoing process protect the zirconium against most of the usual agents encountered at high temperatures including oxygen, air, water, steam and fission products produced in nuclear fuel elements during nuclear fission.

After the plating it is possible to subject the metal coatings on the article to various treatments including diffusion annealing treatments or plating of a second metal.

The process of this invention produces plated articles having increased adhesion between the plated metal layer and the article. The plated articles of this invention will pass an adhesion test (American Society of Testing Materials Standard B571-72) requiring the test specimen to be bent 180° in repeated cycles until the specimen breaks. Following the fracture of the article, no separation of the plated metal layer is detected for the articles plated according to the practice of this invention.

The following non-limiting examples illustrate the results obtained in the practice of this invention for achieving coatings upon zirconium articles.

EXAMPLE 1

A hollow Zircaloy-2 cladding tube 4 meters in length, 10.7 mm. in inside diameter and 12.4 mm. in outside diameter was plated according to the following procedure. The tube had previously been etched in an acid solution of 50% by weight hydrofluoric acid and 50% by weight nitric acid, contacted with an aqueous 50% by weight sodium hydroxide solution and then rinsed in water.

The tube was cleaned in 1.1.1 trichlorethane, rinsed in deionized water and allowed to dry. The inside surface of the final 7.6±1.3 mm. at each end of the tube was coated with a vinyl lacquer.

Next an aged aqueous activating solution was pumped through the tube at the rate of 1000±200 ml./minute. The solution was comprised of 15 grams/liter of ammonium bifluoride, 0.5 ml./liter sulfuric acid and the balance was deionized water. The solution is aged by immersion of pickled zirconium in the solution for about 10 minutes. This pumping was continued for one minute. The temperature of the solution was 21±2° C. throughout the time the solution was pumped through the tube.

The tube was rinsed by circulating room temperature deionized water through the tube for one minute at a flow rate of about 1000±200 ml./minute.

The loosely adhering film (smut) on the inside surface of the tube was removed by immersing the tube in a water bath and applying about 40,000±5000 cycles per second of ultrasonic energy to the tube for one minute while deionized water is circulated through the tube. The water leaving the tube was dark and as time passes becomes lighter in color until after one minute the water was substantially clean.

The ultrasonic energy was turned off and the tube was then further rinsed by circulating deionized water (at room temperature) through the tube for one minute at a flow rate of about 1000±200 ml./minute.

Next a solid cylindrical copper anode 0.125 inch in diameter was inserted into the tube and the tube was plated by pumping an electrolytic copper plating solution through the tube at the rate of 1000±200 ml./minute for 25 minutes under a current density of 20 amps/dm$^2$. The solution was comprised of 200 grams/liter copper sulfate, 100 grams/liter sulfuric acid and 0.005 grams/liter thiourea with the balance water. The temperature of the plating solution was maintained between 34 and 36° C. while being pumped through the tube. The tube was next purged with inert gas (nitrogen) for one minute at a flow rate of 3 cubic feet/minute.

The tube was then rinsed by circulating room temperature deionized water through the tube for five minutes at a flow rate of 1000±200 ml./minute.

The tube was air dried and the lacquer was removed from each end with 1.1.1 trichlorethane.

Examination of the tube showed a copper layer of 10 microns in thickness was substantially uniformly plated on the inside surface of the Zircaloy tube, except for the ends masked with the lacquer.

EXAMPLE 2

The procedure of Example 1 is repeated on another Zircaloy-2 tube of identical dimensions. The process is the same except for a change in the step of removing the loosely adhering film on the tube after the activation step.

For this example, 6 cotton swabs were pneumatically forced through the tube at the rate of about 100 meters/second. The first 5 swabs were observed to be discolored, with each succeeding swab showing less discoloration and the sixth swab being substantially free of any discoloration.

Examination of the tube after the electrolytic plating step showed a copper layer of 10 microns in thickness was substantially uniformly plated on the inside surface of the Zircaloy tube, except for the ends masked with the lacquer.

EXAMPLE 3

The procedure of Example 2 is repeated replacing the cotton swabs with 6 organic swabs prepared by wrapping cylindrical rubber plugs with a single layer of polyester to give a plug diameter of about 10 mm.

The first 5 swabs were observed to be discolored with each succeeding swab showing less discoloration, and the sixth swab being substantially free of any discoloration.

Examination of the tube after the electroless plating step showed a copper layer of 10 microns in thickness was substantially uniformly plated on the inside surface of the Zircaloy tube, except for the ends masked with the lacquer.

EXAMPLE 4

The procedure of Example 1 is repeated on another Zircaloy-2 tube of identical dimensions. The process is identical except for a change in the steps of removing the loosely adhering film on the tube after the activation step.

For this example an aqueous solution comprised of about 10 percent fluoboric acid by volume is pumped through the tube at the rate of 1000±200 ml./minute. This was continued for about one minute and very effectively removed the loosely adhering film from the tube.

Examination of the tube after the electrolytic plating step showed a copper layer of 10 microns in thickness was substantially uniformly plated in the inside surface of the Zircaloy tube, except for the ends masked with the lacquer.

EXAMPLE 5

The procedure of Example 1 is repeated on another Zircaloy-2 tube of identical dimensions. The process is identical except for a change in the step of removing the loosely adhering film on the tube after the activation step.

For this example an aqueous solution comprised of about 10 percent hydrofluosilicic acid by volume is pumped through the tube at the rate of 1000±200 ml./minute. This was continued for about one minute and very effectively removed the loosely adhering film from the tube.

Examination of the tube after the electrolytic plating step showed a copper layer of 10 microns in thickness was substantially uniformly plated on the inside surface of the Zircaloy tube, except for the ends masked with the lacquer.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. In a process for the electrolytic deposition of a metal film on an article comprised of zirconium or a zirconium alloy comprising the steps of
   (a) activating the article in an aqueous activating solution comprising from about 10 to about 20 grams per liter of ammonium bifluoride and from about 0.75 to about 2 grams per liter of sulfuric acid, the solution being aged by immersion of pickled zirconium in said solution for about 10 minutes, and (b) contacting the article with an electrolytic plating solution containing the metal to be deposited on the article in the presence of an electrode receiving current; the improvement comprising removing any loosely adhering film formed on the article in the activating step prior to practicing the contacting step, said improvement of removing any loosely adhering film being selected from the group consisting of (i) immersing the article in water and applying ultrasonic energy on the immersed article, (ii) contacting the article with an aqueous solution comprising from about 2 to about 10 percent fluoboric acid by volume, (iii) contacting the article with an aqueous solution comprising from about 2 to about 10 percent hydrofluosilicic acid by volume, and (iv) contacting the article with a swab.

2. A process according to claim 1 in which the article is rinsed in water after each step of claim 1.

3. A process according to claim 2 in which the water is deionized.

4. A process according to claim 1 in which the step of removing the loosely adhering film comprises immersing the article in water and applying ultrasonic energy on the immersed article.

5. A process according to claim 1 in which the step of removing the loosely adhering film comprises contacting the article with an aqueous solution comprising from about 2 to about 10 percent fluoboric acid by volume.

6. A process according to claim 1 in which the step of removing the loosely adhering film comprises contacting the article with an aqueous solution comprising from about 2 to about 10 percent hydrofluosilicic acid by volume.

7. A process according to claim 1 in which the step of removing the loosely adhering film comprises contacting the article with a swab.

8. A process according to claim 7 in which the swab is comprised of an organic material wrapped on a rubber plug.

9. A process according to claim 8 in which the organic material is polyester.

10. A process according to claim 8 in which the organic material is nylon.

11. A process according to claim 7 in which the swab is comprised of cotton.

12. A process according to claim 1 in which the plated article is subsequently out-gassed by heating at a temperature in the range of about 300° to about 400° F.

13. A process according to claim 1 in which the article is in the form of a long hollow cylindrical tube comprised of a zirconium alloy.

14. In a process for electrolytic deposition of a metal film on an article comprised of zirconium or a zirconium alloy comprising the steps of (a) activating the article in an aqueous activating solution comprising from about 10 to about 20 grams per liter of ammonium bifluoride and from about 0.75 to about 2 grams per liter of sulfuric acid, the solution being aged by immersion of pickled zirconium in said solution for about 10 minutes, (b) rinsing the article in water, and (c) contacting the article with an electrolytic plating solution containing the metal to be deposited on the article in the presence of an electrode receiving current; the improvement comprising removing any loosely adhering film formed on the article in the activating step and rinsing the article in water prior to practicing the contacting steps, said improvement of removing any loosely adhering film being selected from the group consisting of (i) immersing the article in water and applying ultrasonic energy on the immersed article, (ii) contacting the article with an aqueous solution comprising from about 2 to about 10 percent fluoboric acid by volume, (iii) contacting the article with an aqueous solution comprising from about 2 to about 10 percent hydrofluosilicic acid by volume, and (iv) contacting the article with a swab.

15. A process according to claim 14 in which the article is in the form of a long hollow cylindrical tube comprised of a zirconium alloy.

16. A process according to claim 14 in which the step of removing the loosely adhering film comprises immersing the article in water and applying ultrasonic energy on the immersed article.

17. A process according to claim 14 in which the step of removing the loosely adhering film comprises contacting the article with an aqueous solution comprising from about 2 to about 10 percent fluoboric acid by volume.

18. A process according to claim 14 in which the step of removing the loosely adhering film comprises contacting the article with an aqueous solution comprising from about 2 to about 10 percent hydrofluosilicic acid by volume.

19. A process according to claim 14 in which the step of removing the loosely adhering film comprises contacting the article with a swab.

* * * * *

UNITED STATES PATENT OFFICE
CERTIFICATE OF CORRECTION

PATENT NO. : 4,137,131
DATED : January 30, 1979
INVENTOR(S) : Robert E. Donaghy

It is certified that error appears in the above-identified patent and that said Letters Patent are hereby corrected as shown below:

Column 1, after "Background Of The Invention" insert --The Government has rights in this invention pursuant to Subcontract No. 3-20-46 under Prime Contract EN-77-C-02-4473 awarded by the U.S. Department of Energy.--

Signed and Sealed this

Seventeenth Day of February 1981

[SEAL]

*Attest:*

*Attesting Officer*

RENE D. TEGTMEYER

*Acting Commissioner of Patents and Trademarks*